Patented Oct. 6, 1953

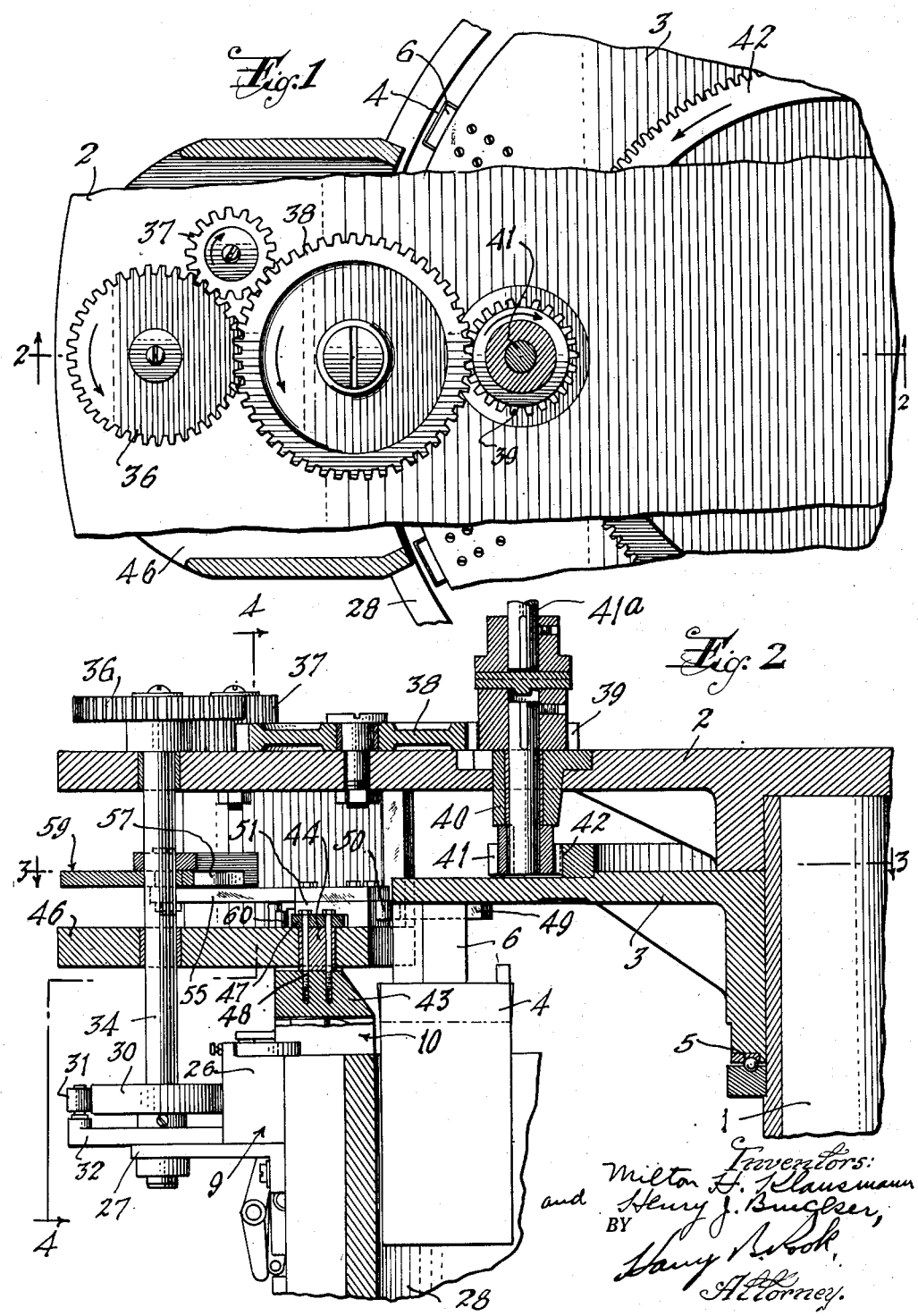

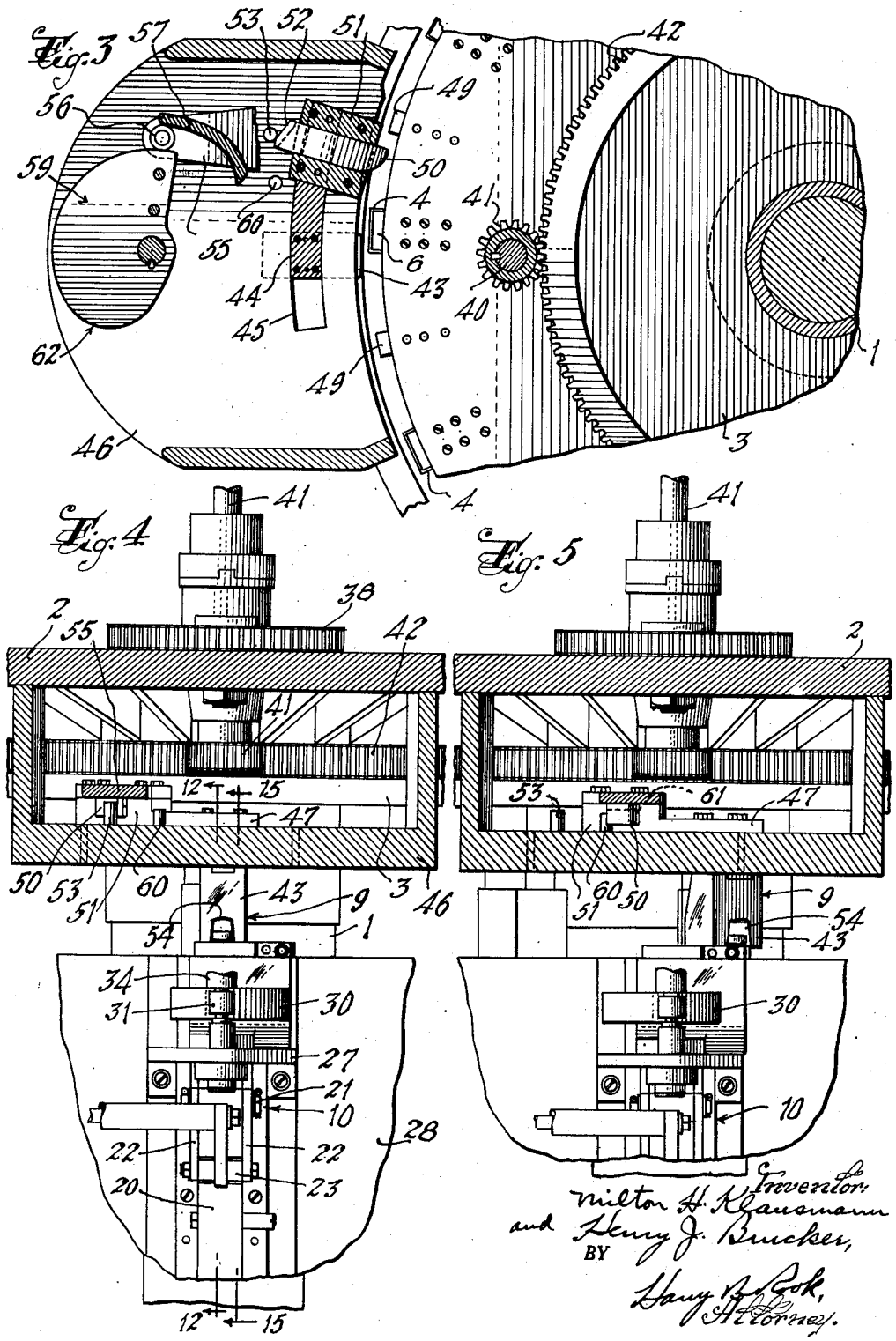

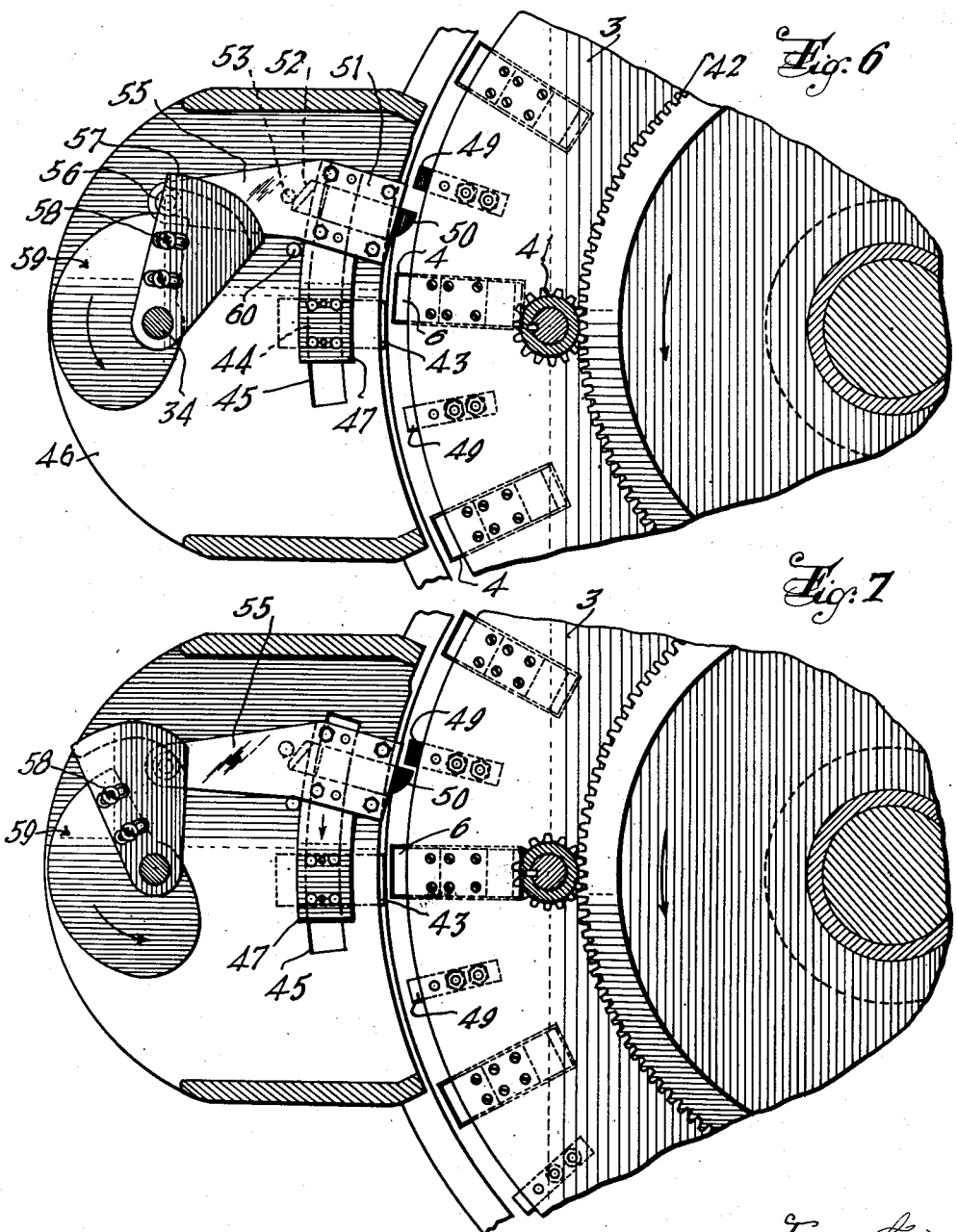

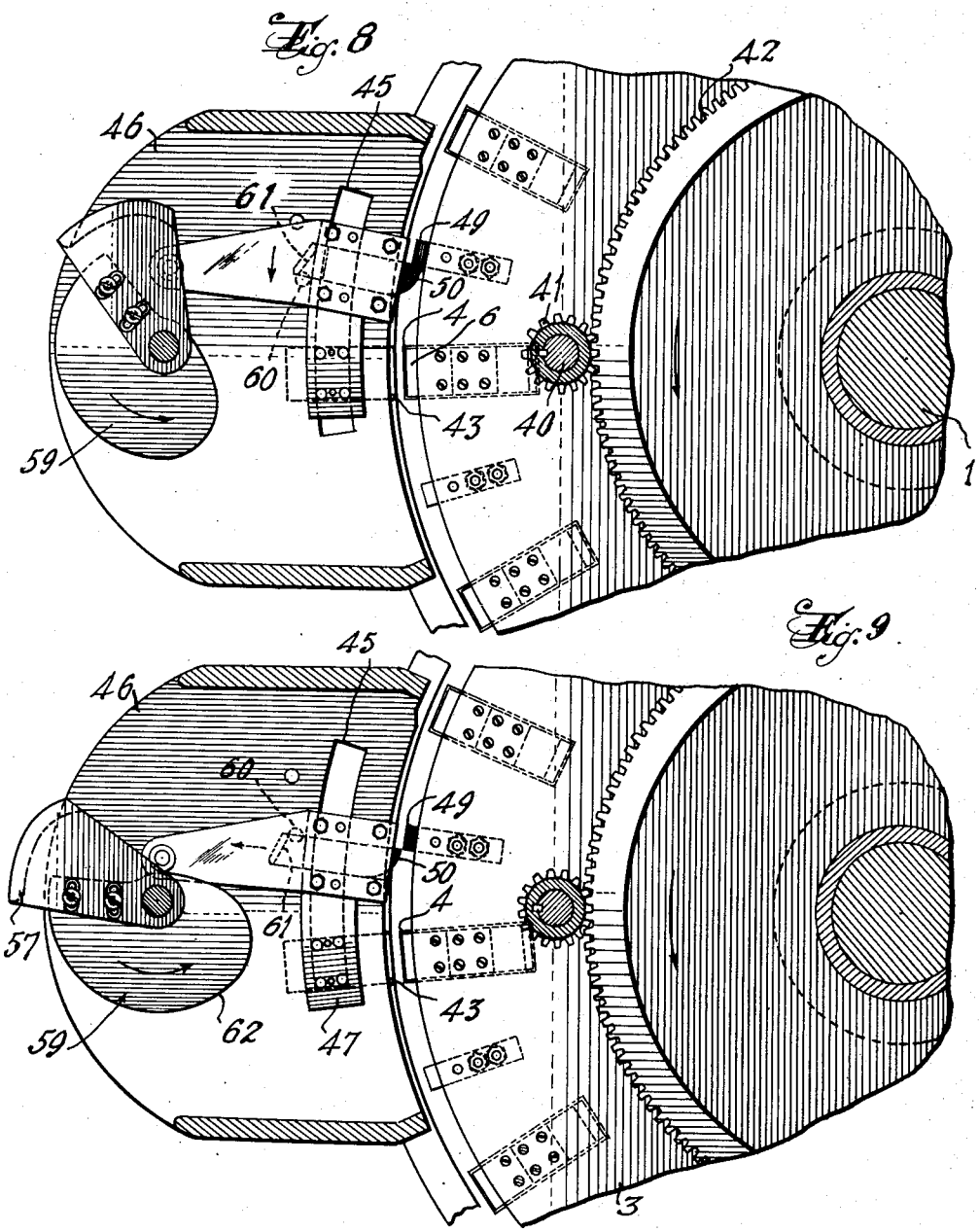

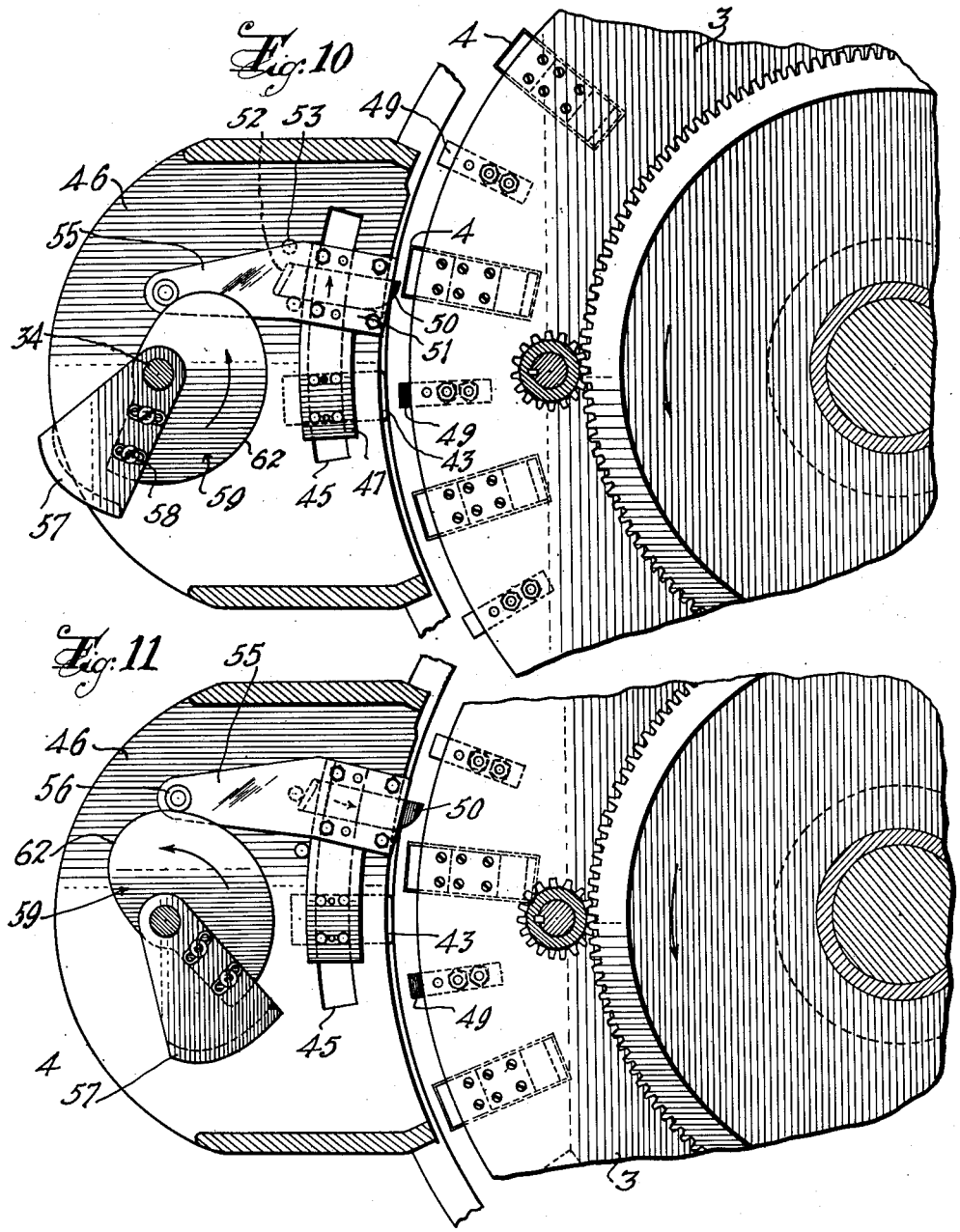

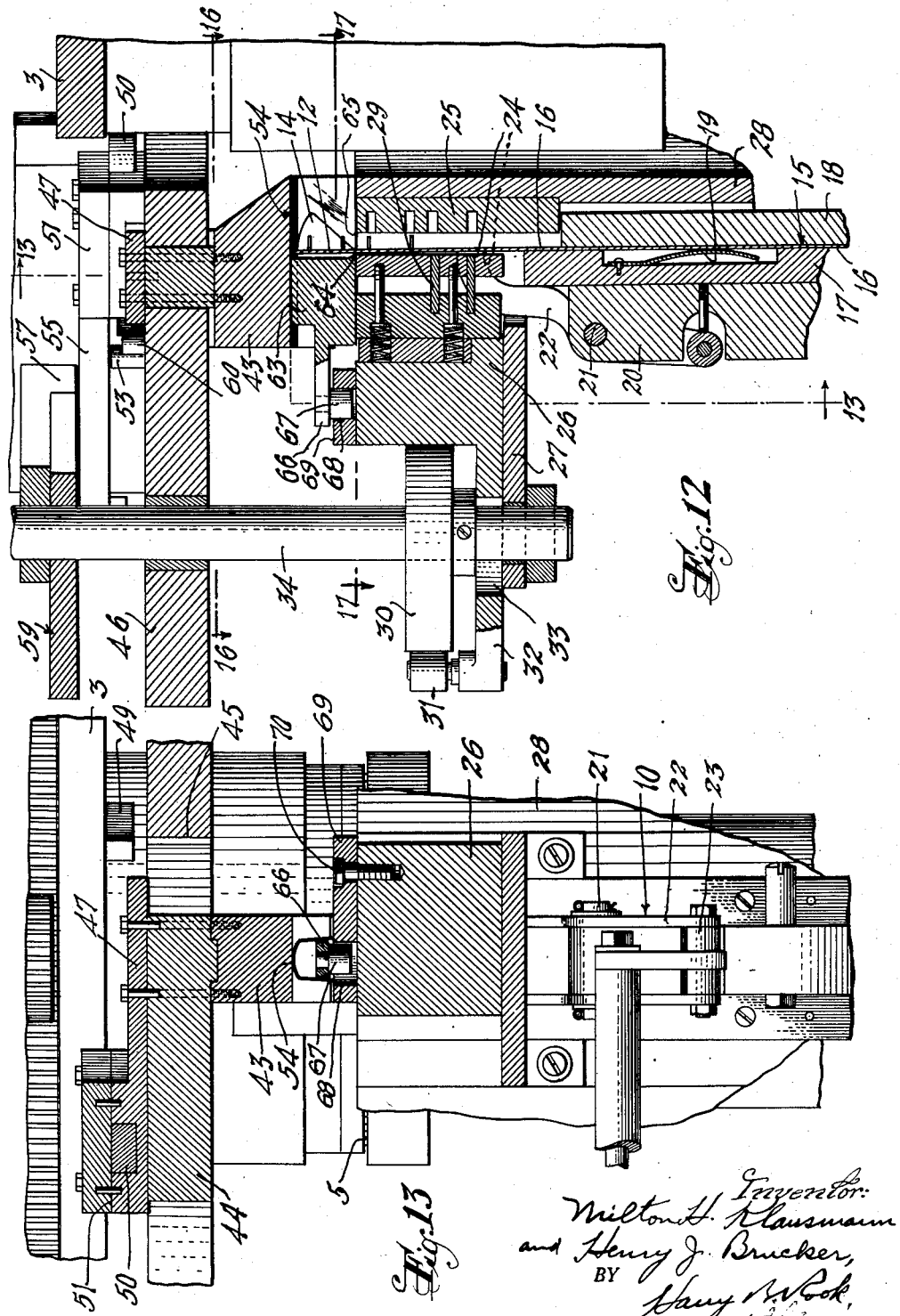

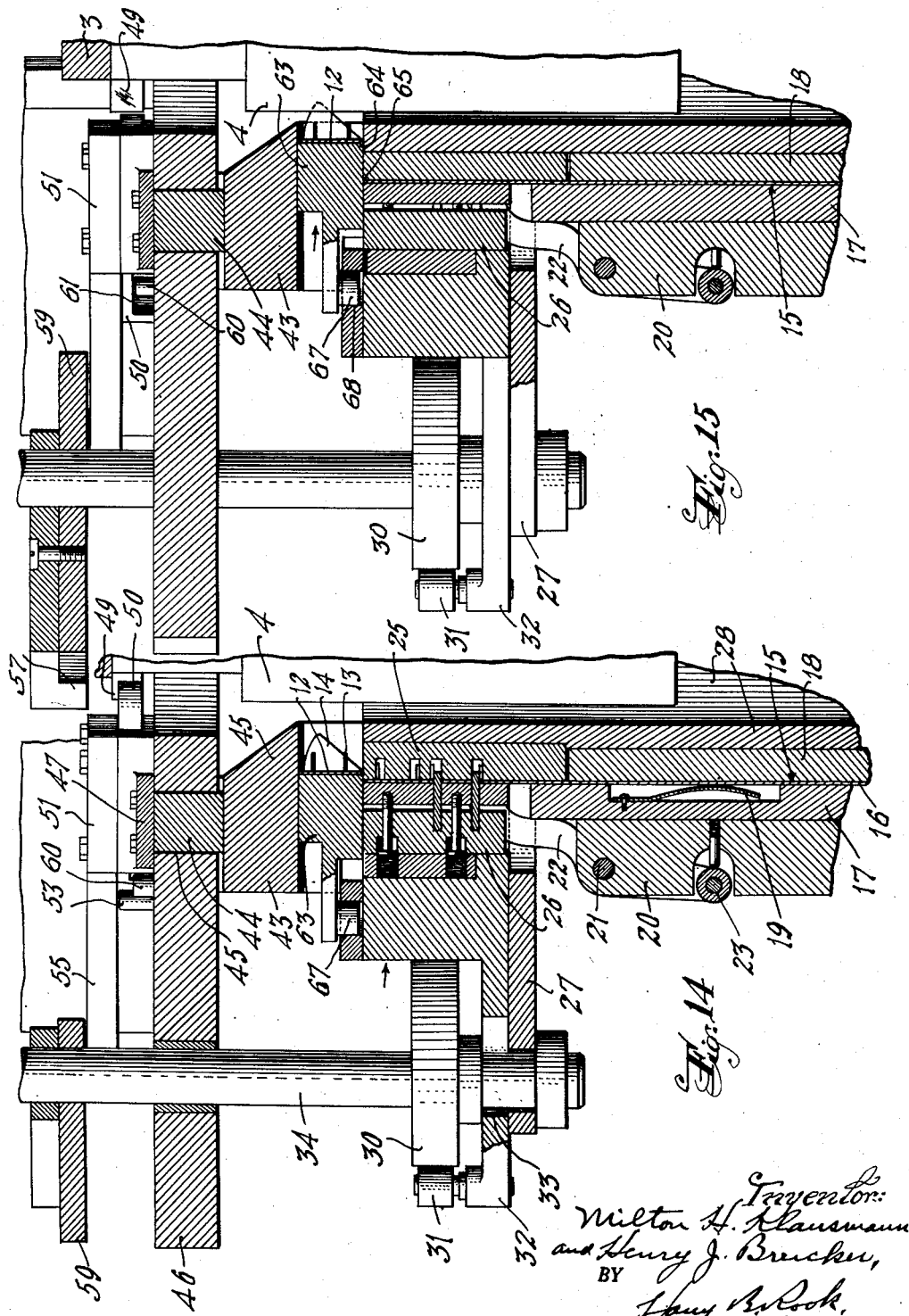

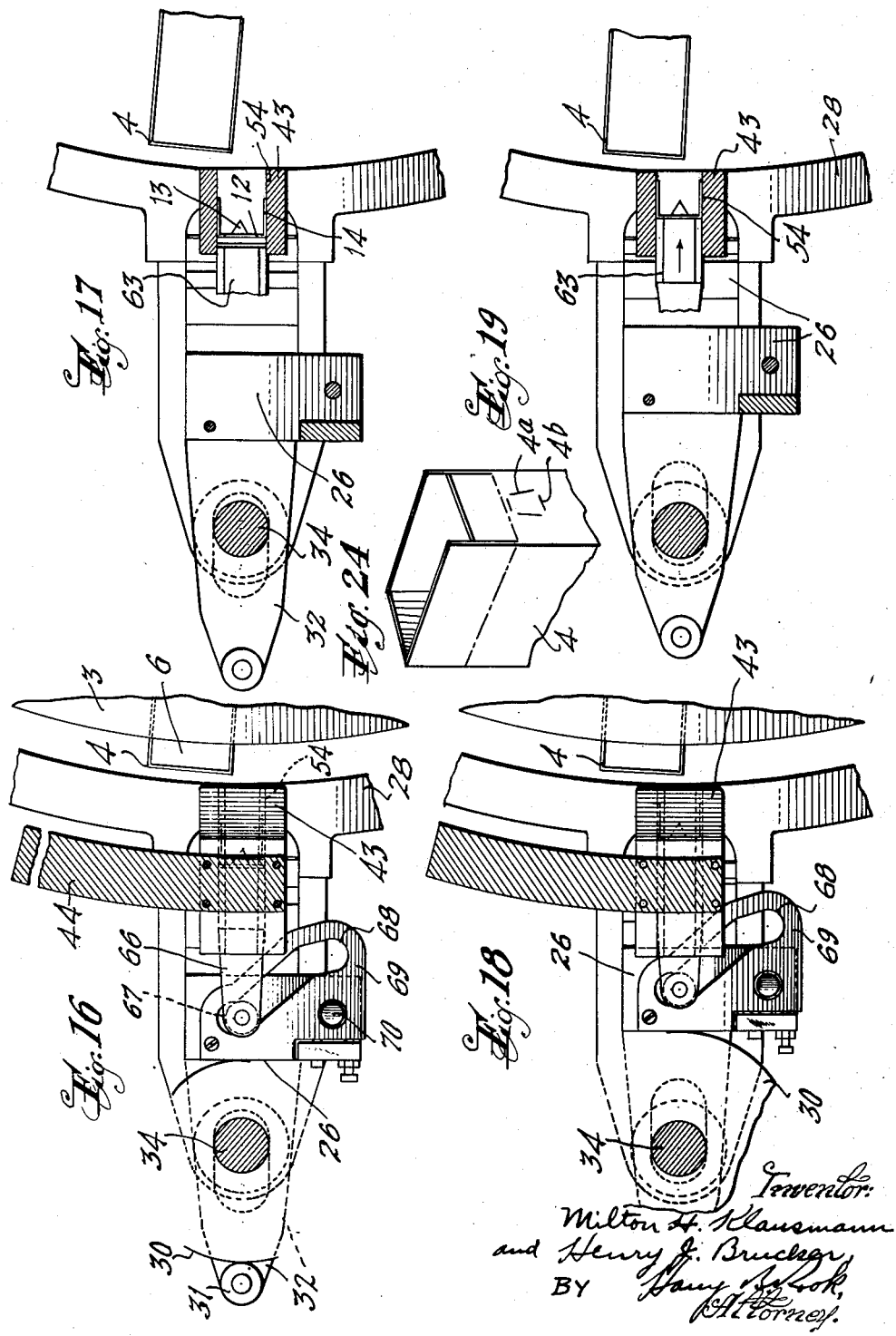

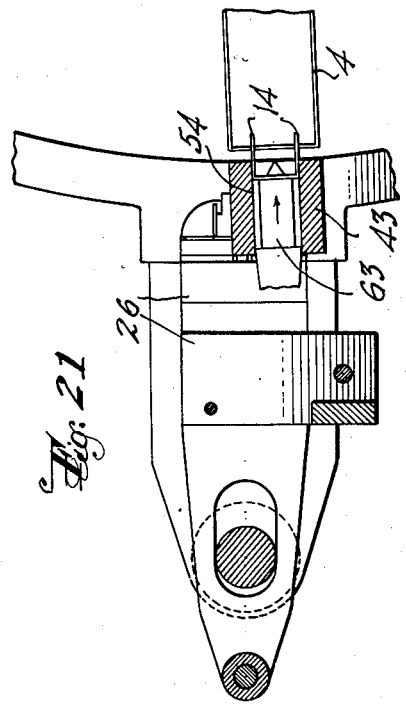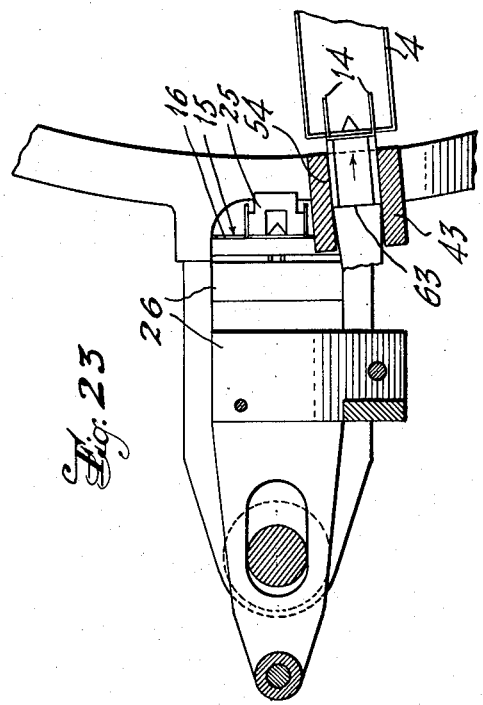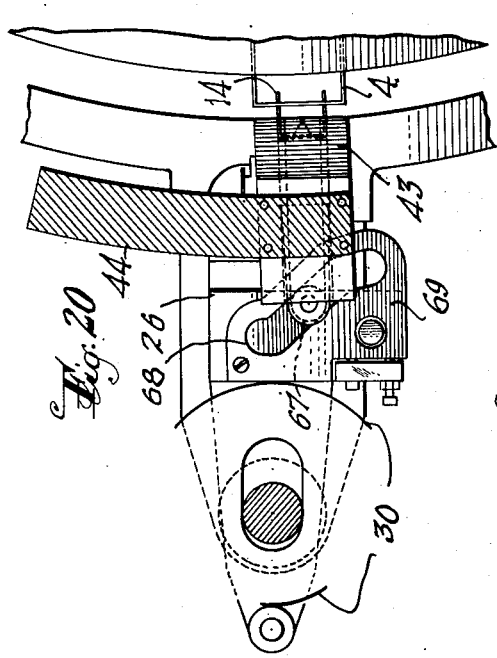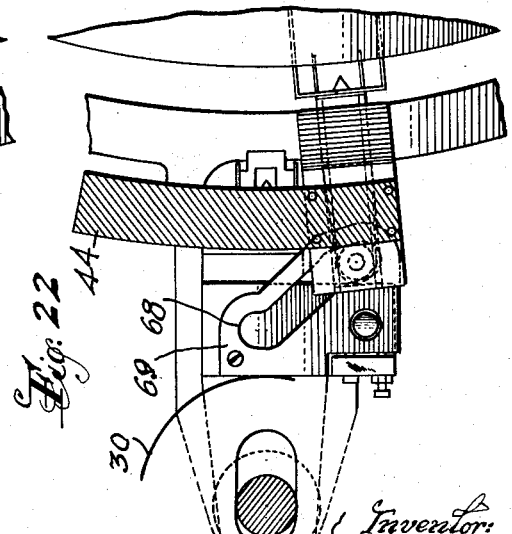

2,654,332

UNITED STATES PATENT OFFICE 2,654,332

MACHINE FOR ATTACHING POURING SPOUTS TO CONTAINERS

Milton H. Klausmann, Maplewood, and Henry J. Brucker, Springfield, N. J., assignors to Seal-Spout Corporation, Newark, N. J., a corporation of New Jersey Application April 19, 1950, Serial No. 156,784

7 Claims. (Cl. 113—1)

This invention relates to a machine for attaching parts to articles, for example, for inserting pouring spouts in containers, and more particularly the invention contemplates a machine for attaching the part, such as a pouring spout, accurately at a predetermined point or in a preformed or preconditioned portion of the article, for example, a container.

The invention has especial advantages when embodied in machines of the character described in United States Patent No. 2,216,733, dated October 8, 1940, and in the application of Henry Brucker, Serial No. 690,901, filed August 16, 1946, now Patent No. 2,589,769 issued March 18, 1952, for inserting pouring spouts into containers.

The combined container and pouring spout includes a box or the like of tearable material, one wall of which usually has a preconditioned portion formed with slits or scores partially outlining a pouring opening, and a pouring spout generally formed of sheet metal or other suitable material and including a body portion overlying the outside of said wall and having sector-shaped wings or flanges concentric with one end of the spout inserted through the wall of the container at said slits or scores, the body portion of the spout being secured to the wall by prongs stamped from the body portion penetrating the wall and clinched over the inner side thereof.

The machine described in said patent includes a carriage or turret for supporting and moving a plurality of containers, each of which has a portion formed to receive a spout, means for continuously moving said carriage through a predetermined path, spout-forming and feeding mechanism disposed at one side of said path including means for feeding a flat strip of spout blanks step by step, forming means for shaping said blanks into spouts, mechanism juxtaposed to said path for severing spouts from said strip and inserting one into said portion of each of said containers, and means for momentarily moving said mechanism synchronously with said containers and along said path of movement while the spouts are being inserted.

The machines disclosed in said patent and said pending application include two units that are operated simultaneously alternately in opposite directions between two positions to receive the spouts from the spout-forming mechanism at one position and insert the spouts into the containers during movement to the other position, so that a spout may be inserted into each of two containers at the same time and thereby enable rapid production of combined containers and spouts.

However, in many cases, a machine which is less expensive but which is capable of about the same rate of production, is desirable, and therefore prime objects of the present invention are to provide a machine for attaching parts, such as pouring spouts, to articles, such as containers, which shall comprise a minimum number of simple and relatively inexpensive parts and at the same time shall be reliable and durable and capable of a rate of production substantially equal to that of the machines of said patent and said pending application; and to provide such a machine which shall include only one spout-inserting unit and novel and improved mechanism for operating said unit, whereby the unit can be rapidly operated to insert spouts at a rate comparable with that of the patented machine having two spout-inserting units.

Furthermore, in the machine disclosed in said patent, the units for inserting the spouts are actuated in the direction of movement of the carriage by engagement of an element on the carriage with an element on the unit, and the impact of the element on the carriage with the other element, particularly when the carriage is rotating at high speed, makes it difficult to effect accurate alinement of the flanges of the spout with the slits or scores in the container, and this problem is aggravated when it is attempted to increase the speed of the machine; and therefore another object of the invention is to provide novel and improved means for actuating the part or spout-inserting unit at high speed and at the same time ensuring proper alinement of the part or spout with the preconditioned portion of the article or container.

Other objects, advantages and results of the invention will be brought out by the following description in conjunction with the accompanying drawings, in which Figure 1 is a fragmentary schematic top plan view of the machine with portions broken away and shown in section;

Figure 2 is a fragmentary vertical sectional view, approximately on the plane of the line 2—2 of Figure 1, with portions shown in side elevation;

Figure 3 is a horizontal sectional view, approximately on the plane of the line 3—3 of Figure 2;

Figure 4 is a fragmentary vertical sectional view, approximately on the plane of the line 4—4 of Figure 2, showing a portion of the spout-forming mechanism and spout-inserting mechanism in front elevation, and illustrating the spout-inserting mechanism at the beginning of its spout-inserting movement;

Figure 5 is a similar view, showing the spout-inserting mechanism at the end of the spout-inserting movement;

Figures 6, 7, 8 and 9 are views similar to Figure 3, showing various steps in the actuation of the spout-inserting unit by the container carriage from the position shown in Figures 2 and 3 to the end of the spout-inserting movement shown in Figures 5 and 9;

Figures 10 and 11 are similar views, showing the return movement of the spout-inserting unit;

Figure 12 is an enlarged fragmentary vertical sectional view, approximately on the plane of the line 12—12 of Figure 4, showing the parts in the position assumed just prior to the beginning of the spout-inserting operation;

Figure 13 is a fragmentary transverse vertical sectional view, approximately on the plane of the line 13—13 of Figure 12;

Figure 14 is a view similar to Figure 12, showing the next successive step in the spout-inserting operation;

Figure 15 is a similar view, approximately on the plane of the line 15—15 of Figure 4;

Figure 16 is a horizontal sectional view, approximately on the plane of the line 16—16 of Figure 12, with the parts in the position assumed just prior to the beginning of the spout-inserting operation;

Figure 17 is a horizontal sectional view, approximately on the plane of the line 17—17 of Figure 12, with parts omitted for clearness in illustration;

Figure 18 is a view similar to Figure 16, showing the next successive step in the spout-inserting operation;

Figure 19 is a view similar to Figure 17, showing the parts in the position illustrated in Figure 18;

Figure 20 is a view like Figure 18, showing the next successive step in the operation;

Figure 21 is a view similar to Figure 19, showing the parts in the positions illustrated in Figure 20;

Figure 22 is a view like Figure 20, showing the parts in the position assumed at the end of the spout-inserting operation;

Figure 23 is a view like Figure 21, with the parts in the positions shown in Figure 22, and Figure 24 is a perspective view of a portion of one of the containers in which the spout is to be inserted.

For the purpose of illustrating the principles of the invention we have shown it in connection with a container carriage and spout-blank-feeding and spout-forming mechanism of the type shown in Patent No. 2,216,733, a novel spout-inserting mechanism and a novel actuating mechanism for said spout-forming mechanism and said spout-inserting mechanism, of the general type disclosed in said pending application Serial No. 690,901.

The machine embodying the invention includes a suitable support which is shown in the form of a pedestal 1 having a base (not shown) and a top plate 2. Supported on the pedestal is a carriage or turret 3 for supporting and moving containers 4 into which pouring spouts are to be inserted, the carriage being shown as rotatable about a vertical axis on a thrust bearing 5 and having an individual carrier 6 for each container which is moved in a predetermined path from a container-inserting or charging station, past a combined spout-blank feeding mechanism and spout-forming mechanism 9, a spout-inserting mechanism 10 and then to a container-discharging station (not shown).

While the machine of the present invention may be utilized for inserting different types of spouts or other articles into different forms of containers or other supports, for the purpose of illustrating the principles of the invention the spout herein contemplated comprises a body portion 12, prongs 13 on the body portion to penetrate and be clinched upon a container wall for securing a spout therein, and wings or flanges 14 movable in the pouring opening of the container as the spout is moved from closed to open position.

The spout-blank feeding mechanism includes a guideway 15 for a continuous strip 16 of spout blanks which includes a plurality of flat blanks connected in end to end relation, each blank being shaped to provide the body portion and side wings of a finished spout. This guideway is shown as formed between two plates 17 and 18, a flat spring 19 being provided in a recess between said plates for yieldingly frictionally holding the blank strip against movement. Means for pushing the blank strip through said guideway includes a block 20 slidably mounted in the outer plate 17 and having pivotally connected thereto at 21, a pair of feed dogs 22 which are connected to move together by a cross-rod 23 at their lower ends, the upper ends of the dogs having inturned fingers 24 to engage behind the edges of the respective blanks of the blank strip 16. The block 20 and the dogs 22 may be reciprocated and oscillated, respectively, by any suitable means such as that illustrated in Patent No. 2,216,733, so as to feed the blank strip one blank at a time into the spout-forming mechanism.

The spout-forming mechanism includes a die 25 juxtaposed to the guideway 15 at one side thereof and a complemental movable die 26 at the opposite side of the guideway. The movable die is reciprocable on a bracket 27 forming a part of an auxiliary frame 28 which is supported on the pedestal 1 in any suitable manner. The two dies are so shaped as to bend up the side wings 14 of the spout when the reciprocating die 26 is moved toward the die 25 from the position shown in Figure 12 to the position shown in Figure 14, and simultaneously, the prongs 13 of the next succeeding spout blank are formed by punches 29 carried by the die 26, all in substantially the same manner as shown and described in Patent No. 2,216,733. The reciprocation of the die 26 is shown as effected by a cam 30 which is engaged by follower rollers 31 on a plate extension 32 of the die block 26, the plate extension having a slot 33 through which passes a countershaft 34 that is journaled in the bracket 27 and in the top plate 35 of the machine and upon which the cam 30 is mounted. Instead of the spout-forming mechanism above described, we might use spout-forming mechanism like that shown in Patent No. 2,300,099, dated October 27, 1942.

The shaft 34 is driven through a gear 36 at the upper end of the shaft that meshes with a long idler pinion 37 which also meshes with a gear 38 journaled on the top plate and meshing with a drive pinion 39 connected to a drive shaft 40 to one end of which is coupled a transmission shaft 41a that may be driven by any suitable source of power such as an electric motor mounted on the top plate 35. At the other end of the drive shaft 40 is a pinion 41 meshing with a ring gear 42 secured on the top of the container carriage 3 for driving the carriage.

The spout-inserting mechanism 10 is disposed above the guideway 15 and spout-forming mechanism 9 and includes a spout holder and carrier 43 that is movable momentarily synchronously with the carriage and juxtaposed to an individual carrier as the latter moves in its predetermined path. As shown (Figures 2, 3 and 6), the holder is mounted on an arcuate slide 44 concentric with the path of movement of the carriers and slidable in a slot 45 in a bracket plate 46 depending from the top plate 2. The spout holder underlies and slides along the bottom surface of the bracket plate 46 and is connected to and cooperates with a guide plate 47 that rests and slides upon the upper surface of the bracket plate. As shown, the spout holder and plate 47 are connected to each other and to the slide 44 by cap screws 48.

In accordance with the invention, the holder is actuated in the direction of movement of the carriers 6 by lugs 49 on the carriage cooperating with a latch bar 50 that is slidable in a block 51 fixedly connected to the slide 44. As shown, these lugs 49 are disposed between the carriers, as best shown in Figure 6, and the latch bar 50 is successively projected into and retracted from the path of movement of the lugs so as to successively connect the block 51 and slide 44 to the carriage and release the block therefrom. As shown, the end of the latch opposite that which engages the lug 49 is beveled at 52 to cooperate with a stud 53 on the bracket plate 46 so as to project the latch 50 when the block 51 and spout holder 43 are in their initial positions, as shown in Figure 3, where a spout-receiving channel 54 in the spout holder is disposed above and in alinement with the guideway 15 of the spout-forming mechanism so as to receive the completed spout at the upper end of the spout blank strip, as shown in Figure 12.

It is a feature of the invention that the slide and spout holder are set in motion and actuated to a speed slightly less than that of the lug 49 before the lug strikes the latch bar, whereby to eliminate or reduce to the minimum the shock incident to the impact of the lug 49 with the latch bar. For this purpose, an auxiliary mechanism is provided and includes an actuating member such as arm 55 on the block 51, roller 56 carried by the arm, and a driving member such as cam flange 57 which cooperates with the roller. Cam flange 57 is adjustably mounted by a screw and slot connection 58 on a cam disc 59 which is keyed on countershaft 34. In operation, as the carrier approaches the spout holder 43, the cam flange 57 engages the roller 56, as shown in Figure 3, and initiates movement of the slide 44 and spout holder in the direction of movement of the carrier, as shown in Figure 7. During this movement of the slide, the lug 49 on the carriage will have approached the latch bar 50, as shown in Figure 7. At about this point, the cam flange 57 will leave the roller 56 and the lug 49 will engage the latch bar, as shown in Figure 8, whereupon the slide and spout holder will be moved directly by the carriage to the spout-inserting position, as shown in Figure 9. At this point, the latch bar 50 is retracted from the lug 49 by a stud 60 on the bracket plate 46 which enters a cam slot 61 in the underside of the latch bar so as to withdraw the latter, as shown in Figure 9. Thereupon the block 51, slide 44 and spout holder 43 are returned to their initial positions by engagement of the cam surface 62 of the cam disk 59 with the roller 56, as best shown in Figures 9 and 3, after which the operation is repeated for the next carrier 6 on the carriage. It will be observed that with this construction, the carriage can be run at high speed and the spout holder can be rapidly oscillated so as to ensure a high rate of insertion of pouring spouts into containers, accurately and with a minimum of vibration and strain of the parts.

During the momentary movement of the spout holders with the carriers, the spouts are simultaneously inserted into the containers carried by the carriers. The spout holder receives a spout into its spout-receiving channel 54 and a ram 63 is slidable in said channel successively to sever the spout from the spout blank strip, to push the completed spout through the channel and to insert the flanges and prongs of the spout through the walls of the container which preferably will have been slitted or scored at 4a and 4b (Figure 24) in any suitable way, such as shown in said Patent No. 2,216,733, to facilitate the entry of the flanges and prongs, respectively. As shown, the ram 63 has a knife edge 64 which cooperates with an edge 65 on the die 25 so as to sever the completed spout from the spout blank strip, as shown in Figure 14. The pusher or ram 63 may be of any suitable construction, but as shown, comprises a bar of a cross-section approximately corresponding to the shape of the channel 54 and has an arm 66 which carries a roller 67 that rides in a cam slot 68 which is disposed in a plate 69 connected as by cap screws 70 to the die block 26 (see Figures 12, 13 and 16). With this construction, it will be observed that the roller 67 will be caused to move to the right in the slot 68 when the spout holder is moved synchronously with the container carrier so as to push the spout through the channel 54 and through the walls of the container, as shown in Figures 16 to 23, inclusive, and that the movement of the spout holder with the carrier and container will continue only long enough to permit the ram 63 to push the spout into the container, as shown in Figure 23.

As the prongs are inserted through the container wall, they are clinched in any suitable way, for example, as taught by Patent No. 2,216,733.

Generally describing the operation of the machine, the spouts are formed successively through reciprocation of the die block 26 by the cam 30 and are projected step by step into the channel 54 of the spout holder, as shown in Figure 12. One spout is so projected simultaneously with the partial formation of the next succeeding spout as the die block 26 moves toward the die section 25, and during this movement the completed spout is severed and pushed through a portion of its movement toward the container carrier. Movement of the spout holder is started by the cam flange 57 and quickly thereafter the latch bar 50 is engaged by one of the lugs 49 so as to locate the container on the corresponding carrier accurately with respect to the spout holder and at the same time move the spout holder synchronously with the container, as shown in Figure 8. During the movement of the spout holder with the container, the roller 67 will be actuated by the cam slot 68 to push the spout from the spout holder through the wall of the container, as shown in Figures 15 and 20 to 23, inclusive.

After the spout has been inserted into the container, the containers are removed from the carriers by any suitable means such as shown in Patent No. 2,216,733 or in the above-mentioned application Serial No. 690,901.

While we have shown and described the invention as embodied in certain specific structural details, it should be understood that this is primarily for the purpose of illustrating the now preferred embodiment of the invention and that many modifications and changes can be made in the construction of the machine, particularly the motion-initiating and accelerating mechanism for the spout holder, all within the spirit and scope of the invention.

Having thus described the invention, what we claim is:

1. A machine for attaching parts to articles comprising a support, a carriage on said support having a carrier thereon for holding and moving the article and movable in a predetermined path, a unit to hold a part and movable alternately in opposite directions, means to move said unit in one direction momentarily synchronously with said carrier along a portion of said path including cooperative normally disengaged elements one on said carriage and the other on said unit and engageable during movement of said carriage to move said unit, auxiliary mechanism other than said elements including a driving member mounted on the support and an actuating member on said unit operatively associated with the driving member to cause the actuating member to be moved in timed relation to the movement of said carriage for initiating movement of said unit in said direction prior to engagement of said elements and for continuing such movement at a speed slightly less than that of the carriage until engagement of said elements, and means on said unit for attaching a part to an article during each said movement of said unit with the carrier.

2. A machine as defined in claim 1, wherein the driving member is a cam rotatable about an axis on said support and in engagement with the actuating member for moving the actuating member in timed relation to the movement of said carriage.

3. A machine as defined in claim 1, with the addition of means for disengaging said elements, means for actuating said unit in the opposite direction after the disengagement of said elements, and wherein the driving member is a cam rotatable about an axis on said support and in engagement with the actuating member for moving the actuating member in timed relation to the movement of said carriage.

4. A machine as defined in claim 1, wherein the driving member is a cam rotatable about an axis on said support and in engagement with the actuating member for moving the actuating member in timed relation to the movement of said carriage, and with the addition of means for causing disengagement of said elements, and means for actuating said unit in the opposite direction including a cam rotatable about the same axis.

5. A machine as defined in claim 1, wherein the driving member is a cam rotatable about an axis on said support and in engagement with the actuating member for moving the actuating member in timed relation to the movement of the carriage and with the addition of means for causing disengagement of said elements, and a second cam rotatable about the said axis and engageable with said actuating member after disengagement of said actuating member from the first-named cam, to actuate said unit in the opposite direction.

6. A machine for attaching parts to predetermined portions of articles, comprising a carriage having a plurality of carriers, one for each article, means for actuating said carriage to move said carriers in a predetermined path, a unit common to said carriers and movable with each thereof in succession and synchronously therewith during movement of said carriers through a portion of said path for receiving and moving each part from a certain point juxtaposed to said path, means for actuating said unit including an element on said unit and an element on said carriage in predetermined relation to each carrier, said elements being normally disengaged, means for causing engagement of said element on said unit successively with said elements on said carriage to move said unit in one direction synchronously with said carriage, auxiliary mechanism other than said elements including a driving member mounted on said support and an actuating member on said unit operatively associated with the driving member which actuating member is moved in timed relation to the movement of said carriage for initiating movement of said unit in said direction prior to engagement of said elements and for continuing such movement at a speed slightly less than that of said carriage until engagement of said elements, means on said unit for attaching a part to an article during each said movement of said unit by and with said carriage, means for causing disengagement of said elements after said part has been attached, and means for actuating said unit in the other direction after the disengagement of said elements.

7. A machine is defined in claim 6, wherein said mechanism includes a member on said unit and a cam rotatable about an axis on said support in timed relation to the movement of said carriage engageable with said member to move said unit into proper alinement with the portion of an article to which said part is to be attached prior to engagement of said elements and automatically disengageable from said member at approximately the time of engagement of said elements, said unit being movable by and with said carriage thereafter, and wherein the means for actuating said unit after disengagement of said elements includes a cam rotatable about the same axis as the first-named cam and engageable with said member after disengagement of said elements.

MILTON H. KLAUSMANN.
HENRY J. BRUCKER.

References Cited in the file of this patent

UNITED STATES PATENTS

| Number | Name | Date |
|---|---|---|
| 2,216,733 | Brucker | Oct. 8, 1940 |
| 2,425,170 | Wunsch | Aug. 5, 1947 |
| 2,425,726 | Bunnell | Aug. 19, 1947 |